United States Patent [19]

Senso

[11] Patent Number: 4,653,040

[45] Date of Patent: Mar. 24, 1987

[54] DISK SIZE DETECTING CIRCUIT

[75] Inventor: Hitoshi Senso, Saitama, Japan

[73] Assignee: Pioneer Electronic Corporation, Tokyo, Japan

[21] Appl. No.: 713,114

[22] Filed: Mar. 18, 1985

[30] Foreign Application Priority Data

Mar. 16, 1984 [JP] Japan .................................. 59-51650

[51] Int. Cl.[4] .......................... G11B 19/28; G11B 3/60
[52] U.S. Cl. .................................... 369/239; 318/312; 318/318; 318/327; 369/190; 369/243
[58] Field of Search ............... 369/239, 243, 266, 267, 369/217, 189, 190; 318/327, 318, 314, 312

[56] References Cited

U.S. PATENT DOCUMENTS 4,302,833 11/1981 Tanaka et al. ....................... 369/239

FOREIGN PATENT DOCUMENTS 53-34502 3/1978 Japan .................................. 369/239

Primary Examiner—Steven L. Stephan
Attorney, Agent, or Firm—Sughrue, Mion, Zinn, Macpeak & Seas

[57] ABSTRACT

In a disk size detecting circuit, the size of a disk is determined according to the speed of a motor adapted to rotate the disk and the angle through which motor has rotated after the start thereof. A counter, which is reset with the signal which starts the operation of the motor, counts pulses indicative of the amount of rotation of the motor. A rotational speed detector circuit, which may take the form of a frequency-to-voltage converter followed by a voltage comparator or a frequency counter followed by a digital comparator, produces a signal indicating the rotational speed of the motor. The output of the counter and the output of the rotational speed detector are applied to a circuit which discriminates the size of the disk according to the two signals.

8 Claims, 5 Drawing Figures

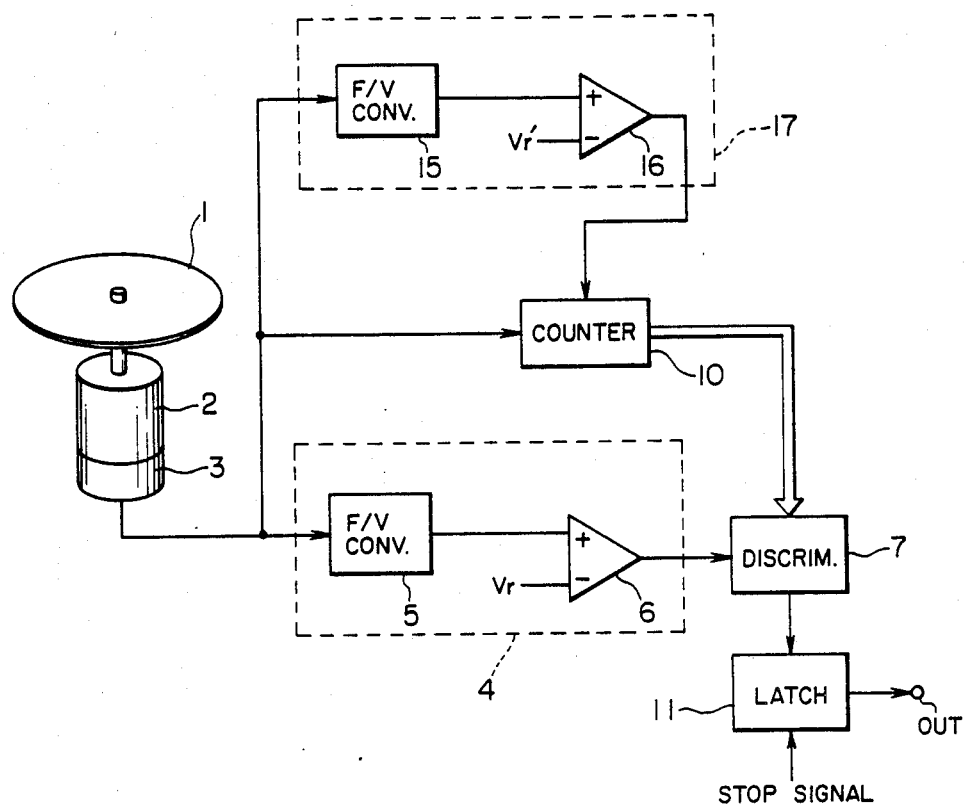

DISK SIZE DETECTING CIRCUIT

BACKGROUND OF THE INVENTION

The present invention relates to a disk size detecting circuit for detecting the size of a disk set in a video disk player or audio disk player.

A conventional disk size detecting circuit is shown in FIG. 1. In FIG. 1, a rotational speed detecting pulse generator 3 outputs a rotational speed detecting pulse signal having a pulse repetition frequency corresponding to the rotational speed of a motor 2 driving a disk 1. The pulse generaator 3 is designed as follows: a slit is formed in the periphery of a disk which is fixed to the rotary shaft of the motor 2. Light is applied to the periphery of the disk where the slit if formed, and a photoelectric conversion element produces a pulse when light passes through the slit.

The output pulse signal of the rotational speed detecting pulse generator 3 is applied to a frequency detecting circuit 4 forming a rotational speed detecting circuit. In the frequency detecting circuit 4, the output pulse signal of the pulse generator 3 is applied to an F/V (frequency-to-voltage) converter circuit 5. The F/V converter circuit 5 is formed with an integrator circuit so as to provide a voltage corresponding to the repetition frequency of the pulse signal received, that is, the rotational speed of the motor 2. The output voltage of the F/V converter circuit 5 is applied to a comparator where it is compared with a reference voltage $V_r$. When the speed of the motor 2 reaches a predetermined value, that is, when the output voltage of the F/V converter circuit 5 reaches the reference voltage $V_r$, the output of the comparator 6 is raised to a high level. The high level signal indicates the fact that the speed of the motor 2 has reached a predetermined value to a discriminating circuit 7, to which the output of a timer 8 is also supplied. In the timer 8, the output clock pulse signal from a reference oscillator 9 is subjected to frequency division to provide a pulse signal having, for instance, a period of 1/100 second. The latter signal is applied as a clock pulse signal input to a counter, the output count data of which indicates, with an accuracy of 1/100 second, the amount of time lapsed following generation of a start signal to start the motor 2. Furthermore, the discriminating circuit 7 is designed so that, upon generation of the predetermined speed detection signal, the output data of the timer 8 and predetermined reference value are subjected to comparison so that, when the output data of the timer 8 is a value less than the predetermined reference value, the output of the discriminating circuit is set to a low level, and, when the output data of the timer 8 is higher than the predetermined reference value, the output is raised to a high level. The output of the discriminating circuit 7 is applied to an output terminal OUT.

In the circuit thus constructed, the moment of inertia of the disk 1, which is proportional to the square of the radius of the disk 1, affects the motor rise time. Thus, if the voltage applied to the motor is constant, the time required for the speed of the motor to reach a predetermined value decreases as the moment of inertia decreases. Therefore, the period of time which elapses from the instant that the start signal used to start the motor 2 is generated until the predetermined speed detection signal is produced changes according to the size (diameter) of the disk 1.

Accordingly, the circuit can be designed so that, when the size of the disk 1 is small, the count value of the timer 8 at the generation of the predetermined speed detection signal is equal to or smaller than a predetermined reference value, and when the size of the disk is large, the count value of the timer 8 at the generation of the predetermined speed detection signal is larger than the predetermined reference value. In this case, the output of the discriminating circuit 7 is set to a low level when the size of the disk 1 is small, and the output of the circuit 7 is raised to a high level when the size of the disk 1 is large. In this manner, the size of the disk can be determined.

In the above-described conventional disk size detecting circuit, the rise time of the motor 2 is, in general, long compared with the repetition frequency of the clock pulse signal. Accordingly, relatively many flip-flop circuits are required to subject the clock pulse signal to frequency division and to form the counter in the timer 8. As a result, the circuit is necessarily large in scale and high in manufacturing cost.

SUMMARY OF THE INVENTION

Accordingly, an object of the invention is to provide a disk size detecting circuit which can be made smaller in size than a conventional one, and accordingly provided at lower manufacturing cost.

The foregoing object and other objects of the invention have been achieved by the provision of a disk size detecting circuit which comprises: an electric motor for rotating a disk; rotational speed detecting means for detecting the rotational speed of the motor and in response producing a signal indicating the rotational speed; rotational angle detecting means for detecting the angle through which the motor rotates from the start thereof to produce a signal indicating a value corresponding to the angle; and discriminating means for discriminating the size of the disk according to the output of the rotational angle detecting means.

The nature, principle and utility of the invention will become more apparent from the following detailed description when read in conjunction with the accompanying drawings.

BRIEF DESCRIPTION OF THE DRAWINGS

In the accompanying drawings:

FIGS. 2 through 5 are block diagrams showing respective first through fourth examples of a disk size detecting circuit according to the invention.

DESCRIPTION OF THE PREFERRED EMBODIMENTS

Figure 1:
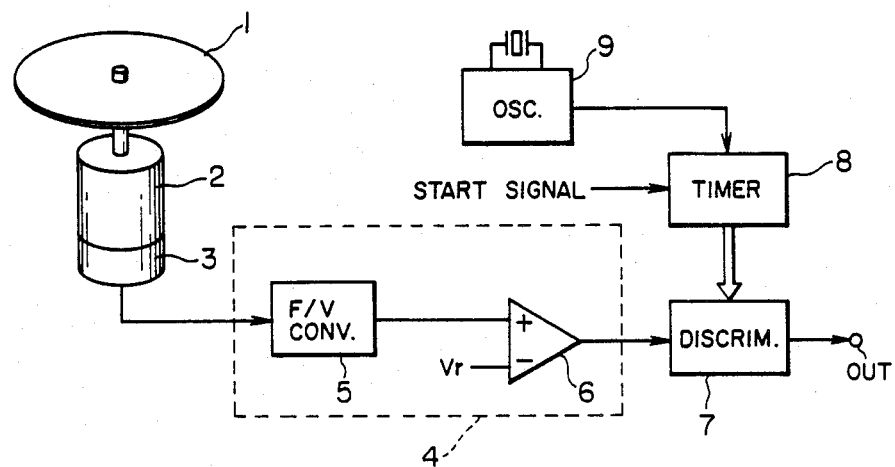
FIG. 1 is a block diagram showing a conventional-disk size detecting cricuit.
Figure 2:
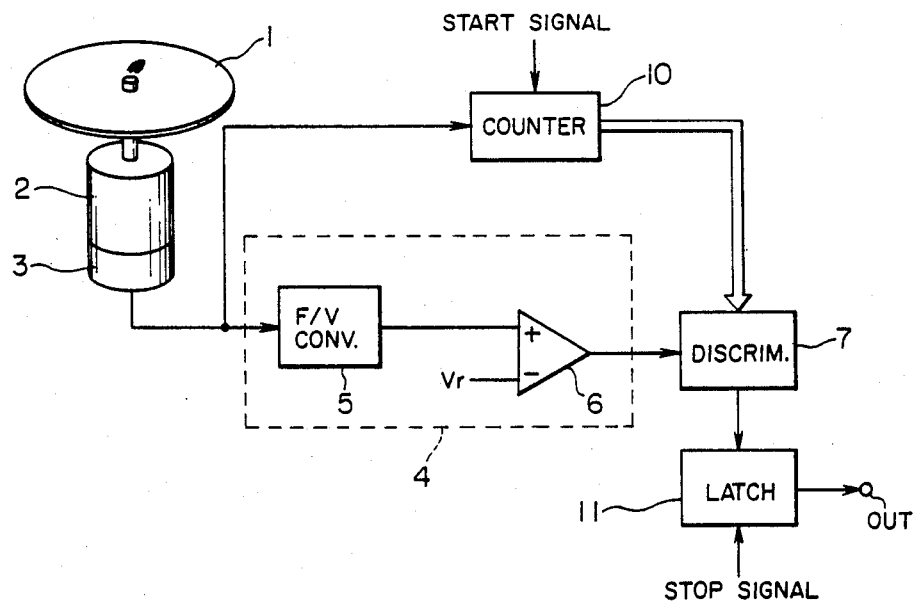

A first example of a disk size detecting circuit according to the invention is constructed as shown in FIG. 2. In this circuit, a rotational speed detecting pulse generator 3 for producing a pulse signal having a repetition frequency corresponding to the speed of a motor 2, a frequency detecting circuit 4, and a discriminating circuit 7 are connected as in the conventional circuit shown in FIG. 1. In accordance with the invention, it should be noted that the output pulse signal of the pulse generator 3 is further applied to a counter 10, which forms a rotational angle detecting device. In response to a start signal to instruct the start of the motor 2, the counter 10 starts counting pulses outputted by the pulse generator 3. The output of the counter 10 is applied to the discriminating circuit 7, the output of which is stored in a latch circuit 11. A stop signal, which is outputted by a control circuit (not shown) when the motor 2 is stopped, is applied to the reset input terminal of the latch circuit 11 to reset the content stored therein. The output of the latch circuit 11 is applied to the output terminal OUT.

It is assumed that, in the circuit thus constructed, the start signal has been produced and the motor 2 is running with a predetermined torque $T_0$. The torque $T_0$ can then be represented by the following expression:

$$T_0 = J \frac{d\omega}{dt}, \quad (1)$$

where J is the moment of inertia of the disk 1 and $\omega$ is the angular speed of the motor 2.

The expression (1) can be rewritten as follows:

$$\frac{d\omega}{dt} = \frac{T_0}{J}. \quad (2)$$

Therefore, it can be understood that, in the case of constant torque acceleration, the disk 1 undergoes constant acceleration. Accordingly, at the start of the motor 2, the time $t_f$ required for the motor to reach a predetermined angular speed $\omega_f$ from rest is determined by the moment of inertia J.

The angular speed $\omega_f$ can be represented by:

$$\omega_f = \frac{T_0}{J} t_f. \quad (3)$$

The angle $\phi_f$ through which the motor 2 turns until the angular speed of the motor 2 reaches $\omega_f$ is:

$$\phi_f = \frac{1}{2} \frac{T_0}{J} t_f^2. \quad (4)$$

From expressions (3) and (4), the following expression can be obtained:

$$\phi_f = \frac{1}{2} \frac{J}{T_0} \omega_f^2. \quad (5)$$

Therefore, it can be understood that the angle $\phi_f$ is proportional to the moment of inertia J. That is, the angle $\phi_f$ increases when the size of the disk 1 is large and decreases when the size of the disk is small. A value corresponding to the angle $\phi_f$ is obtained from the output count value of the counter 10 at the generation of the predetermined speed detection signal outputted by the frequency detecting circuit 4. Therefore, if the reference value of the discriminating circuit 7 is set between the count value of the counter 10 present at the generation of the predetermined speed detection signal when the size of the disk 1 is small and the count value of the counter 10 present at the generation of the predetermined speed detection signal when the size of the disk is large, the output of the discrimination circuit 7 is set to the low level when the size of the disk 1 is small and raised to the high level when the size is large. The size of the disk is determined in this manner.

The circuit shown in FIG. 2 is obtained by removing the timer 8 and the reference oscillator 9 from the circuit shown in FIG. 1 and adding the counter 10. The repetition frequency of the rotational speed detecting pulse signal applied to the clock input terminal of the counter 10 is much lower than that of the clock pulse signal. Therefore, the number of flip-flops in the counter 10 can be relatively small and the circuit small in scale.

Figure 3:
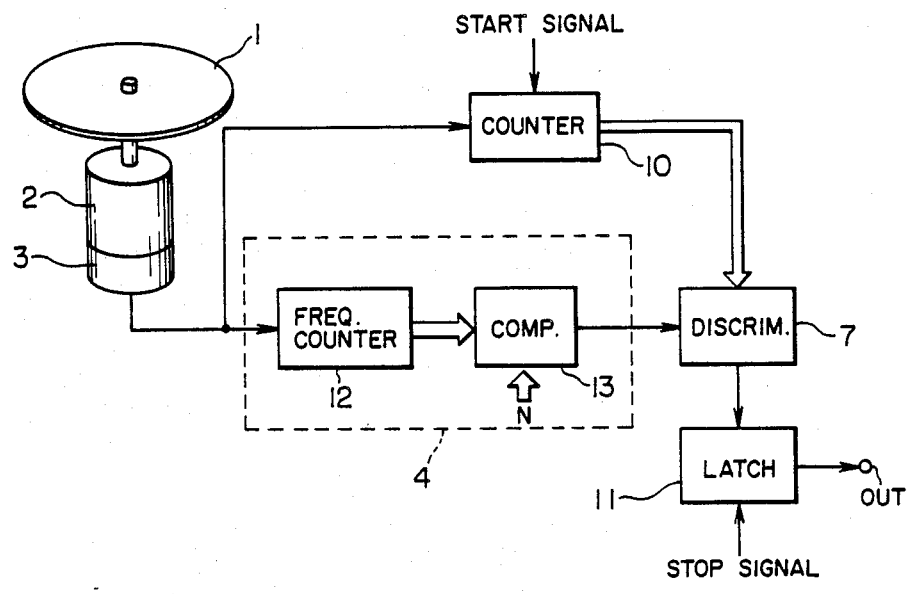

A second example of a disk size detecting circuit according to the invention is shown in FIG. 3. The rotational speed detecting pulse generator 3 for producing a pulse signal having a repetition frequency corresponding to the rotational speed of a motor adapted to drive a disk 1, the frequency detecting circuit 4, the discriminating circuit 7, the counter 10 and the latch circuit 11 are connected similarly to the first example of the circuit shown in FIG. 2. However, in the frequency detecting circuit 4 of FIG. 3, the rotational speed detecting pulse signal is applied to a frequency counter 12. The frequency counter 12 counts the rotational speed detecting pulses produced in a predetermined period of time. The output of the frequency counter 12 is applied to a comparison circuit 13 where it is compared with a predetermined value N. When the output of the frequency counter 12 becomes equal to the predetermined value N, the output of the comparison circuit 13 is raised to the high level. The high level output is applied, as the predetermined speed detection signal, to the discriminating circuit 7.

In the circuit thus constructed, when the speed of the motor 2 reaches the predetermined value and the output data of the frequency counter 12 becomes equal to the predetermined vaue N, the comparison circuit 12 generates a high level output, indicative that the predetermined speed has been reached, to the discriminating circuit. Therefore, the circuit provides the same effects as the circuit shown in FIG. 2.

Figure 4:
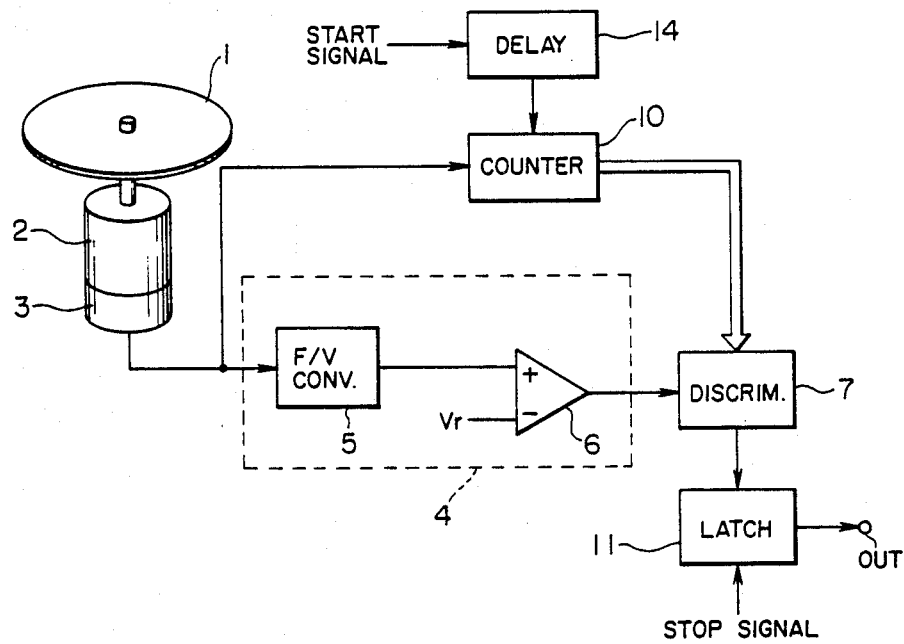

FIG. 4 shows a third example of a disk size detecting circuit according to the invention. The arrangement of the circuit is similar to that of the first example of the circuit shown in FIG. 2 except that the start signal, after being delayed for a predetermined period of time by a delay circuit 14, is applied to the counter 10. By making the signal delay time of the delay circuit 14 shorter than the time interval which elapses from the time instant that the start signal is produced until the predetermined speed detection signal becomes active, the disk size detecting circuit shown in FIG. 4 attains the same effects as the circuit shown in FIG. 2. In the circuit of FIG. 4, the number of flip-flops can be further reduced.

FIG. 5 shows a fourth example of a disk size detecting circuit according to the invention. In this example, the rotational speed detecting pulse generator 3 for producing a pulse signal having a repetition frequency corresponding to the speed of the motor 2 used to drive the disk 1, the frequency detecting circuit 4, the discriminating circuit 7, the counter 10 and the latch circuit 12 are connected in the same manner as in FIG. 2. However, it should be noted that, instead of the start signal, the detection output of another frequency detecting circuit 17 is implemented with an F/V converter circuit 15 and a comparator 16. By setting the reference voltage $V_r'$ of the comparator 16 to a value lower than the reference voltage $V_r$ so that the detection output of the frequency detecting circuit 17 is generated earlier than that of the frequency detecting circuit 4, the disk size detecting circuit in FIG. 5 provides the same effects as the circuits of FIGS. 2, 3 and 4. As in the disk size detecting circuit shown in FIG. 4, the number of flip-flops in the counter 10 can be further reduced.

In the above-described examples of a disk size detecting circuit, the motor 2 is accelerated with the predetermined torque $T_0$. However, the technical concept of the invention is applicable to cases also in which the motor 2 is not accelerated with the predetermined torque $T_0$. However, the technical concept of the invention is applicable with the determined torque $T_0$. Furthermore, in the above-described disk size detecting circuit of the invention, a stop signal is supplied to the reset input terminal of the latch circuit 11. On the other hand, an ejection signal for ejecting the disk may be applied to the reset input terminal of the latch circuit 11. In this case, the data detected at the first start of the motor 2 is maintained stored in the latch circuit until the disk is changed, and therefore the disk size detecting circuit may be modified so that disk size detection is not carried out when the motor 2 is started again.

In the above-described disk size detecting circuits, the size of a disk is determined according to the angle through which the motor rotates until the speed of the motor reaches the predetermined value. However, the circuit may be modified that the size of the disk is detected according to the speed of the motor 2 when the motor's rotation angle reaches a predetermined value.

As is apparent from the above description, in the disk size detecting circuit of the invention, the size of a disk is determined according to the speed of the motor driving the disk and the angle through which the motor rotates after its start. Therefore, instead of a timer and reference oscillator for the timer, counter simple in arrangement can be used to detect the size of a disk. Thus, the disk size detecting circuit of the invention is smaller in size than the conventional circuit, and accordingly it can be provided at lower manufacturing cost.

I claim:

1. A disk size detecting circuit comprising:
    an electric motor for rotating a disk;
    rotational speed detecting means for producing a speed signal having a first state when a rotational speed of said motor exceeds a predetermined rotational speed and a second state otherwise;
    rotational angle detecting means for producing an angle signal indicating an angle through which said motor has rotated after the start thereof; and
    means for comparing said angle signal with a reference value at a transition of said speed signal between said first and second states, thereby discriminating the size of said disk.

2. The disk size detecting circuit of claim 1, wherein said rotational angle detecting means comprises a counter having a count input receiving a pulse signal, each pulse indicating a predetermined angular rotation of said motor and further having an output applied to said comparing means.

3. The disk size detecting circuit of claim 2, wherein said rotational speed detecting means comprises: a rotational speed detecting pulse generator coupled to said motor, said input of said counter being coupled to an output of said rotational speed detecting pulse generator; a frequency-to-voltage converter having an input coupled to said output of said rotational speed detecting pulse generator; and a voltage comparator having a first input terminal coupled to an output terminal of said frequency-to-voltage converter and a second input terminal coupled to a source of a reference voltage.

4. The disk size detecting circuit of claim 2, wherein said rotational speed detecting means comprises: a rotational speed detecting pulse generator coupled to said motor; a second counter having a count input coupled to an output of said rotational speed detecting pulse generator; and a digital comparator having a first input port coupled to a count output port of said second counter and a second input port receiving a comparison digital value.

5. The disk size detecting circuit of claim 2, wherein a start signal for starting operation of said motor is applied to a reset input of said counter.

6. The disk size detecting circuit of claim 2, further comprising delay means coupled between a source of a start signal for starting operation of said motor and a reset input of said counter.

7. The disk size detecting circuit of claim 3, wherein said rotational angle detecting means comprises:
    a second frequency-to-voltage converter having an input coupled to an output of said rotational speed detecting pulse generator; and
    a second voltage comparator having a first input terminal coupled to an output of said second frequency-to-voltage converter, a second input terminal coupled to a source of a second reference voltage, and an output coupled to a reset input of said counter.

8. The disk size detecting circuit of claim 7, wherein said second reference voltage is lower than said first-mentioned reference voltage.

* * * * *